(12) United States Patent
Orimoto et al.

(10) Patent No.: US 7,354,052 B2
(45) Date of Patent: Apr. 8, 2008

(54) SUSPENSION DEVICE

(75) Inventors: Yukihiro Orimoto, Saitama (JP); Yutaka Hozumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 438 days.

(21) Appl. No.: 11/066,496

(22) Filed: Feb. 28, 2005

(65) Prior Publication Data
US 2005/0200092 A1 Sep. 15, 2005

(30) Foreign Application Priority Data
Mar. 2, 2004 (JP) .......................... JP2004-57450
Mar. 2, 2004 (JP) .......................... JP2004-57453

(51) Int. Cl.
*B60G 3/18* (2006.01)
(52) U.S. Cl. ..................... 280/124.135; 280/93.512
(58) Field of Classification Search .......... 280/93.512, 280/93.511, 124.134, 124.135, 124.136; *B60G 003/18*
See application file for complete search history.

(56) References Cited

U.S. PATENT DOCUMENTS 3,380,154 A * 4/1968 Siebertz et al. ............. 438/186
7,117,599 B2 * 10/2006 Sadanowicz et al. .. 29/894.361
2005/0200094 A1 * 9/2005 Hozumi ............... 280/124.135

* cited by examiner

Primary Examiner—Ruth Ilan
(74) Attorney, Agent, or Firm—Arent Fox LLP.

(57) ABSTRACT

In manufacturing a knuckle body forged or cast from light alloy of a suspension device, a large vertical height of a pair of bosses protruding downward from front and rear ends in a lower portion of the knuckle body may cause degradation in forgeability or castability of the knuckle body to hinder manufacturing, and also cause reduction in rigidity of the bosses to reduce mounting strength of a lower arm support bracket made of ferrous metal. A vertical height of the pair of bosses of the knuckle body is set to be smaller than a vertical height of the lower arm support bracket, thereby improving forgeability or castability of the knuckle body and increasing rigidity of the bosses.

2 Claims, 6 Drawing Sheets (PRIOR ART 2)

SUSPENSION DEVICE

RELATED APPLICATION DATA

The Japanese priority application Nos. 2004-57450 and 2004-57453 upon which the present application is based are hereby incorporated in their entirety herein by reference.

BACKGROUND OF THE INVENTION

1. Field of the Invention

The present invention relates to a suspension device in which a knuckle is supported by an upper arm and a lower arm. More particularly, the present invention relates to a suspension device in which a knuckle is formed by connecting a knuckle body forged or cast from light alloy and a lower arm support bracket made of ferrous metal, and a suspension device in which an outer end of a lower arm in a vehicle width direction is supported on a lower arm support bracket connected to a lower surface of an upper arm body via a ball joint.

2. Description of the Related Art

FIG. 5 shows a knuckle 01 of a suspension device according to a first conventional example (Prior Art 1). The knuckle 01 is formed by connecting a lower arm support bracket 03 made of ferrous metal to a lower end of a knuckle body 02 forged from light alloy with two bolts 04 and 05, an outer end of an upper arm 06 in a vehicle width direction is connected to an upper end of the knuckle 01, and an outer end of a lower arm 07 in the vehicle width direction is connected to the lower arm support bracket 03. A pair of bosses 02a and 02b protruding downward are integrally formed at front and rear ends in a lower portion of the knuckle body 02 to which the lower arm 07 is connected. Front and rear ends of the lower arm support bracket 03 are fastened to lower surfaces of the bosses 02a and 02b with the bolts 04 and 05.

FIG. 6 shows a knuckle 01 of a suspension device according to a second conventional example (Prior Art 2). A space 08 is formed between a recess 02c interposed between a pair of bosses 02a and 02b of a knuckle body 02 and an upper surface of a lower arm support bracket 03, and an outer end of a lower arm 07 in a vehicle width direction is secured with a nut 09 to an upper end of a ball joint 010 oscillably supported on the lower arm support bracket 03 and extending into the space 08.

In the knuckle 01 of the suspension device according to Prior Art 1, the pair of bosses 02a and 02b significantly protrude from the lower portion of the knuckle body 02, thus the elongated bosses 02a and 02b may cause degradation in forgeability to increase manufacturing costs, and strength of the bosses 02a and 02b may be insufficient to which a heavy load from the lower arm 07 is transferred. Also when the knuckle body 02 is cast from light alloy, the elongated bosses 02a and 02b may interfere with flowing molten metal to cause degradation in castability, and cavities may be created in the bosses 02a and 02b to reduce quality.

In the knuckle 01 of the suspension device according to Prior Art 2, when the nut 09 loosens from vibration caused by driving of a vehicle, the lower arm 07 may fall off from the ball joint 010 leading to separation of the lower arm 07 from the knuckle 01.

SUMMARY OF THE INVENTION

The present invention has been achieved in view of the above-mentioned circumstances, and has a first object to improve forgeability or castability and increase rigidity of a pair of bosses formed in a lower portion of a knuckle body forged or cast from light alloy and secured to a lower arm support bracket made of ferrous metal.

The invention has a second object to prevent a ball joint that supports an outer end of a lower arm in a vehicle width direction from falling off from a knuckle even if a nut for securing the ball joint to the knuckle loosens.

In order to achieve the first object, according to a first feature of the present invention, there is proposed a suspension device including: a knuckle formed by connecting a knuckle body forged or cast from light alloy and a lower arm support bracket made of ferrous metal; an upper arm having an inner end in a vehicle width direction connected to a vehicle body, and an outer end in the vehicle width direction connected to an upper portion of the knuckle body; and a lower arm having an inner end in the vehicle width direction connected to the vehicle body, and an outer end in the vehicle width direction connected to the lower arm support bracket, the lower arm support bracket being secured to lower surfaces of a pair of bosses protruding downward from front and rear ends in a lower portion of the knuckle body, wherein a vertical height of the pair of bosses is smaller than a vertical height of the lower arm support bracket.

In manufacturing the knuckle body forged or cast from light alloy, a large vertical height of the pair of bosses protruding downward from the front and rear ends in the lower portion of the knuckle body may cause degradation in forgeability or castability of the knuckle body to hinder manufacturing, and also cause reduction in rigidity of the bosses to reduce mounting strength of the lower arm support bracket. With the above described configuration, however, the vertical height of the pair of bosses is smaller than the vertical height of the lower arm support bracket, thereby improving forgeability or castability of the knuckle body and increasing rigidity of the bosses to increase mounting strength of the lower arm support bracket.

In order to achieve the second object, according to a second feature of the present invention, there is proposed a suspension device including: a knuckle formed by connecting a lower arm support bracket to a lower surface of a knuckle body so as to form a space; an upper arm having an inner end in a vehicle width direction connected to a vehicle body, and an outer end in the vehicle width direction connected to an upper portion of the knuckle body; and a lower arm having an inner end in the vehicle width direction connected to the vehicle body, and an outer end in the vehicle width direction connected to the lower arm support bracket via a ball joint, the ball joint having a head connected to the lower arm in the space, a shaft extending downward from the head to pass through a mounting hole of the lower arm support bracket, and an external thread extending downward from the shaft and onto which a nut is screwed, wherein a distance between the lower surface of the knuckle body facing the space and an upper surface of the outer end of the lower arm in the vehicle width direction is smaller than a distance between a lower end of the external thread of the ball joint and an upper end of the mounting hole of the lower arm support bracket.

With the above described configuration, the ball joint that supports the outer end of the lower arm in the vehicle width direction on the lower arm support bracket of the knuckle includes the head connected to the lower arm in the space between the knuckle body and the lower arm support bracket, the shaft extending downward from the head to pass through the mounting hole of the lower arm support bracket, and the external thread extending downward from the shaft and onto which the nut is screwed; and the distance between the lower surface of the knuckle body facing the space and the upper surface of the outer end of the lower arm in the vehicle width direction is smaller than the distance between the lower end of the external thread of the ball joint and the upper end of the mounting hole of the lower arm support bracket. Thus, even if the nut loosens and falls off from the external thread, the upper surface of the lower arm interferes with the lower surface of the knuckle body to prevent upward movement the lower arm, thereby preventing the ball joint from falling off from the lower arm support bracket to prevent the lower arm from being separated from the knuckle.

The above-mentioned object, other objects, characteristics, and advantages of the present invention will become apparent from an explanation of preferred embodiments, which will be described in detail below by reference to the attached drawings.

DESCRIPTION OF THE PREFERRED EMBODIMENT

Now, a first embodiment of the invention will be described with reference to FIGS. 1 to 3.

Figure 1:
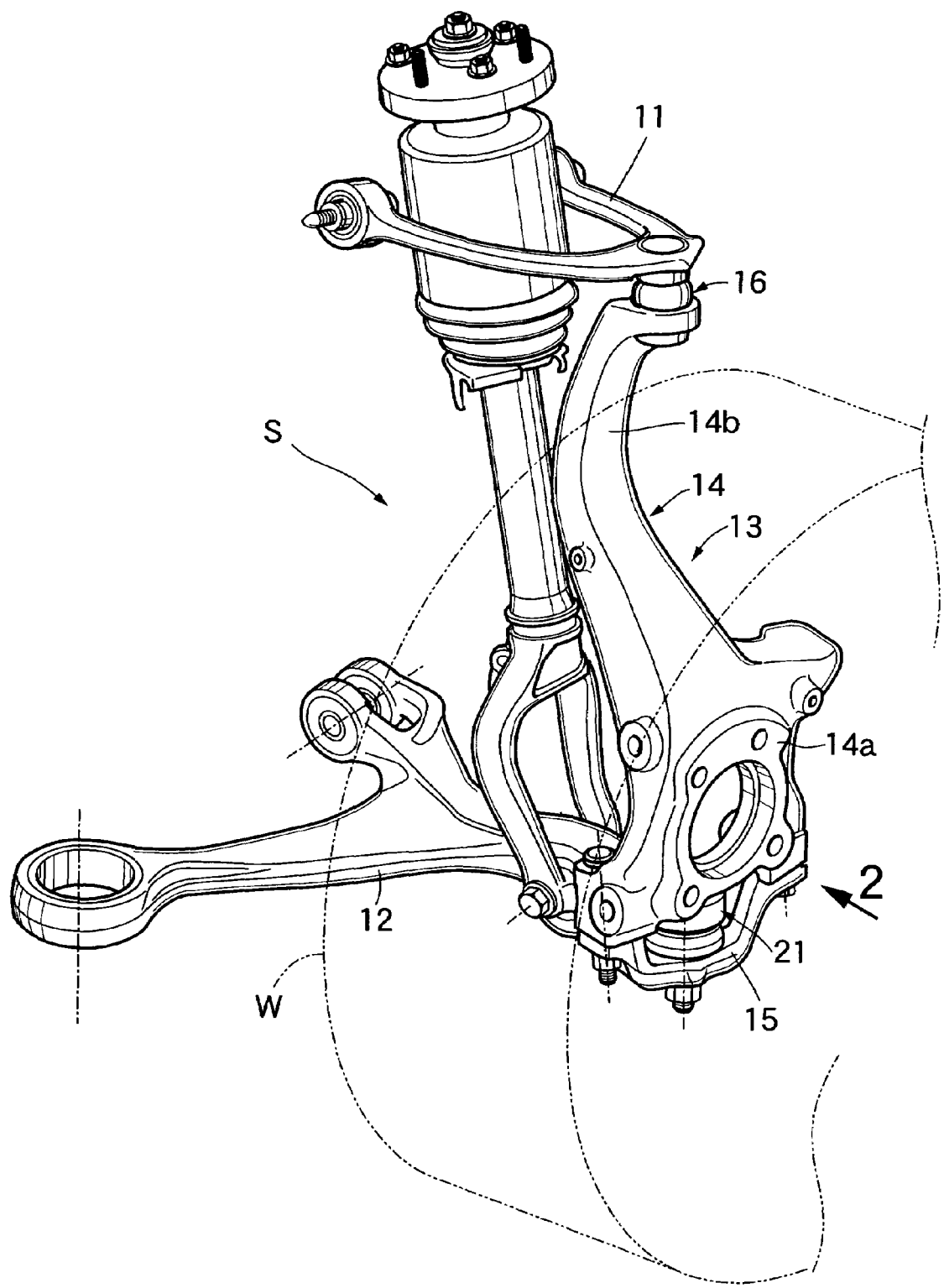
FIG. 1 is a perspective view of a double wishbone type suspension of a left rear wheel, according to a first embodiment of the present invention.
Figure 2:
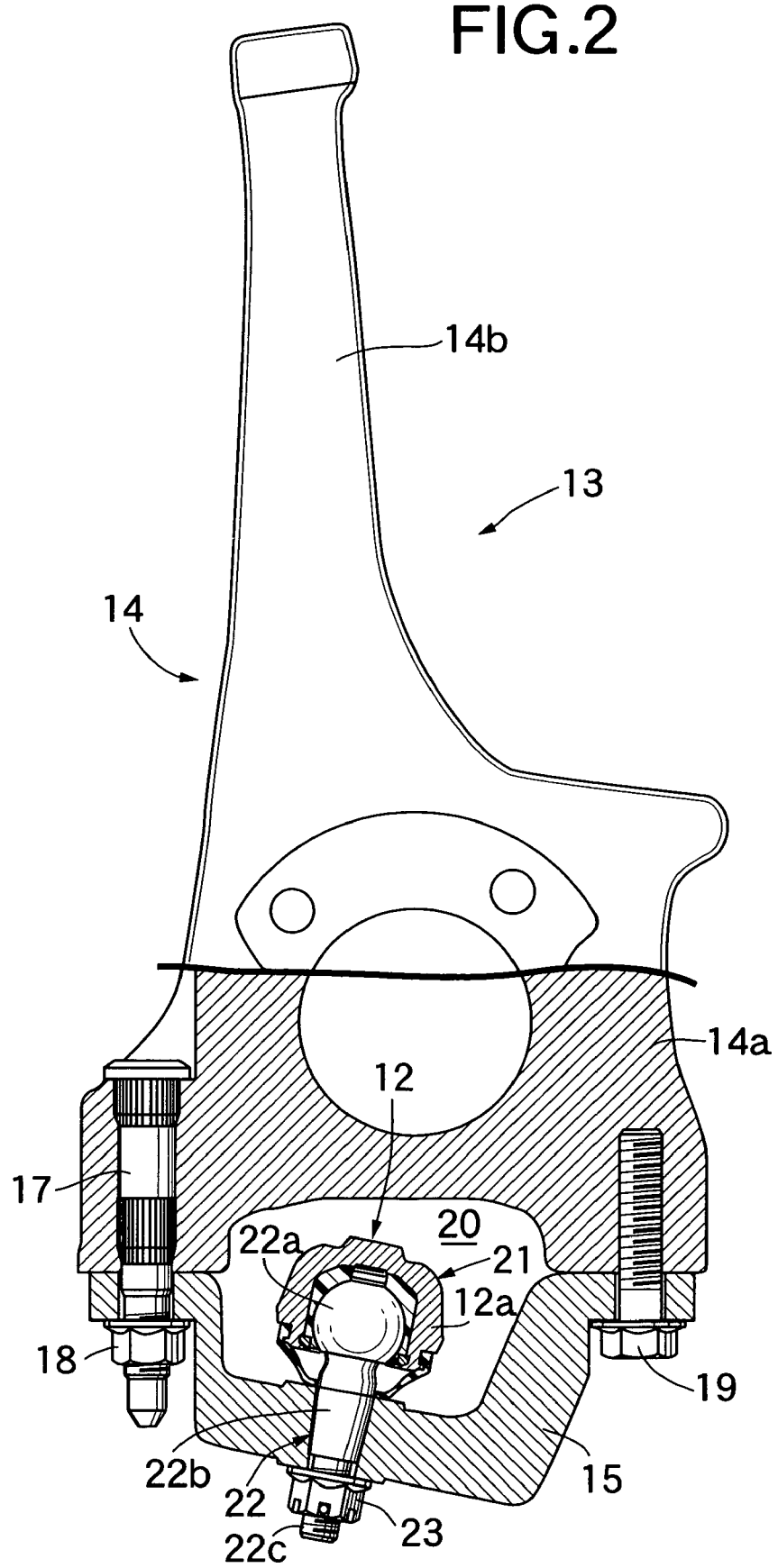
FIG. 2 is an enlarged view on arrow in a direction 2 in FIG. 1.

As shown in FIGS. 1 and 2, a double wishbone type suspension device S includes a knuckle 13 supported on a vehicle body by an upper arm 11 and a lower arm 12. The knuckle 13 includes a knuckle body 14 forged from light alloy and a lower arm support bracket 15 made of ferrous material and fastened to a lower portion of the knuckle body 14. The knuckle body 14 includes an axle support portion 14a that rotatably supports an axle of a wheel W and an upper arm support portion 14b extending upward from the axle support portion 14a. An outer end of the upper arm 11 in a vehicle width direction is pivotably supported on an upper end of the upper arm support portion 14b via a ball joint 16.

Figure 3:
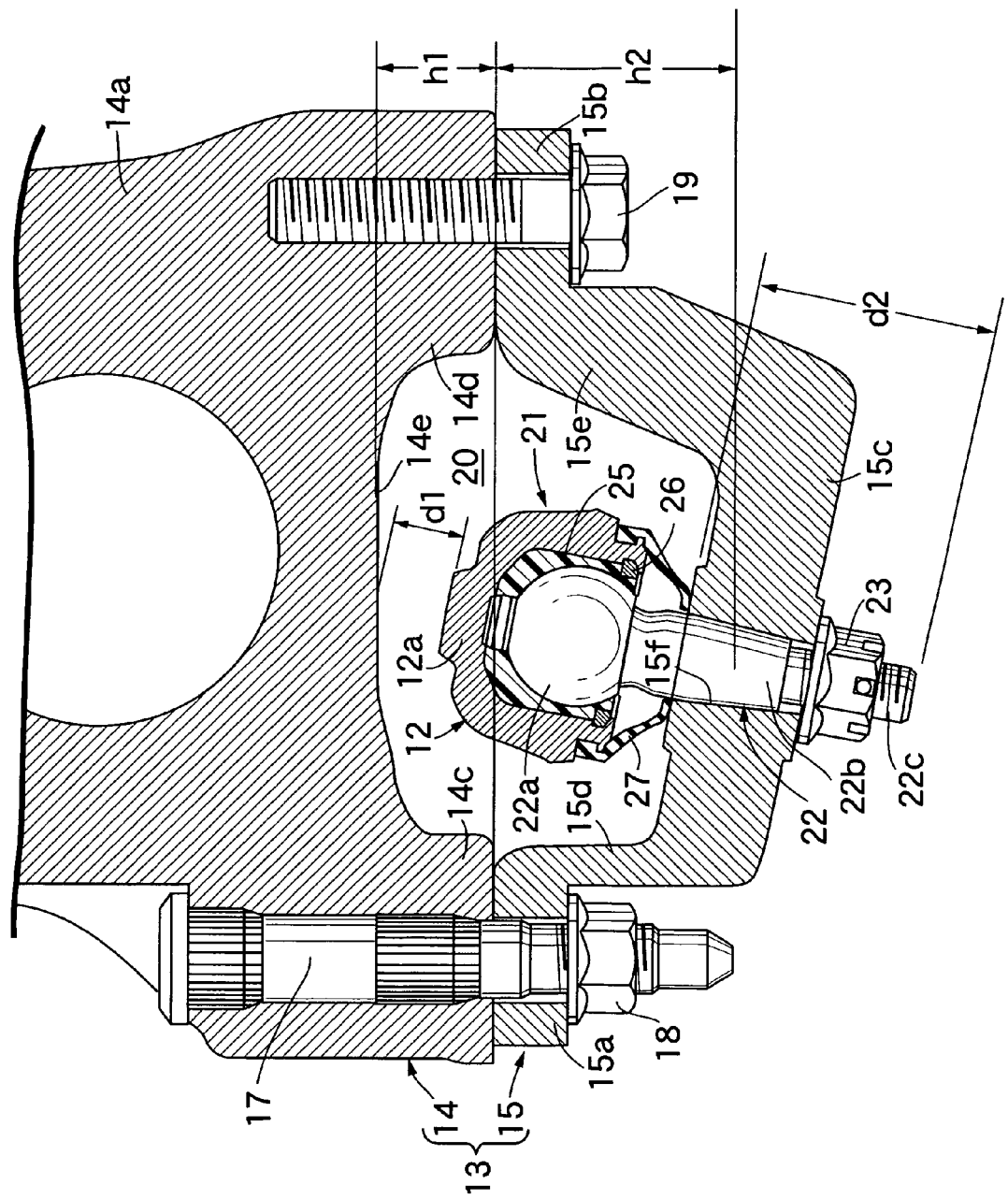
FIG. 3 is an enlarged sectional view of essential portions of FIG. 2.

As is apparent from FIG. 3, a pair of bosses 14c and 14d protrude downward from front and rear ends in a lower surface of the axle support portion 14a of the knuckle body 14. A recess 14e bowed upward is formed between the bosses 14c and 14d. The lower arm support bracket 15 includes mounting portions 15a and 15b at front and rear ends, a lower arm support portion 15c in the middle, and a pair of inclined connecting portions 15d and 15e connecting the mounting portions 15a and 15b and the lower arm support portion 15c. The front mounting portion 15a is secured to a lower end of the front boss 14c with a stud bolt 17 and a nut 18, and the rear mounting portion 15b is secured to a lower end of the rear boss 14d with a bolt 19. The lower arm support portion 15c of the lower arm support bracket 15 is placed in a position lower than the mounting portions 15a and 15b. An outer end of the lower arm 12 in the vehicle width direction is placed in a space 20 formed between the recess 14e of the knuckle body 14 and the lower arm support portion 15c of the lower arm support bracket 15.

A ball joint 21 that pivotably supports the outer end of the lower arm 12 in the vehicle width direction on the lower arm support bracket 15 has a ball stud 22 including a spherical head 22a, a conical shaft 22b connecting to the head 22a, and an external thread 22c connecting to the shaft 22b. The shaft 22b of the ball stud 22 passes from above to down through a mounting hole 15f provided in the lower arm support portion 15c of the lower arm support bracket 15, and is secured by screwing a nut 23 onto the external thread 22c protruding downward from the lower arm support portion 15c. The ball joint 21 includes a cup-shaped housing 12a provided at an end of the lower arm 12. A bearing 25 made of synthetic resin and in slide contact with the head 22a of the ball stud 22 is housed in the housing 12a along an inner peripheral surface thereof, and held by a retainer 26 secured so as to cover an opening of the housing 12a. A boot 27 is fitted between the opening of the housing 12a and the lower arm support portion 15c of the lower arm support bracket 15 so as to prevent dust from entering a slide surface between the head 22a of the ball stud 22 and the bearing 25.

A height h1 from a bottom surface of the recess 14e of the knuckle body 14 to lower ends of the bosses 14c and 14d is smaller than a height h2 from the lower ends of the bosses 14c and 14d to the lower arm support portion 15c of the lower arm support bracket 15, that is, an input point of a load from the lower arm 12 to the lower arm support bracket 15. Thus, the protruding height h1 of the pair of bosses 14c and 14d provided at the lower end of the knuckle body 14 is decreased to facilitate machining for the bosses 14c and 14d to protrude in forging the knuckle body 14 to thereby reduce machining costs, and also increase rigidity of the bosses 14c and 14d to which the load from the lower arm 12 is transferred via the lower arm support bracket 15.

A distance d1 from the bottom surface of the recess 14e of the knuckle body 14 to an upper end of the ball joint 21 is smaller than a distance d2 from an upper end of the mounting hole 15f in the lower arm support portion 15c to a lower end of the external thread 22c of the ball stud 22. Therefore, even if the nut 23 for securing the ball stud 22 of the ball joint 21 to the lower arm support bracket 15 loosens and falls off due to vibration caused by driving of a vehicle, and the shaft 22b of the ball stud 22 is about to slip upward out of the mounting hole 15f in the lower arm support bracket 15, the housing 12a of the ball joint 21 abuts against the bottom surface of the recess 14e of the knuckle body 14 to prevent falling of the ball joint 21 and reliably prevent the lower arm 12 from being separated from the knuckle 13.

Because the ball joint 21 cannot be mounted after the lower arm support bracket 15 is connected to the knuckle body 14, the lower arm support bracket 15 to which the ball joint 21 is previously mounted needs to be connected to the knuckle body 14.

Figure 4:
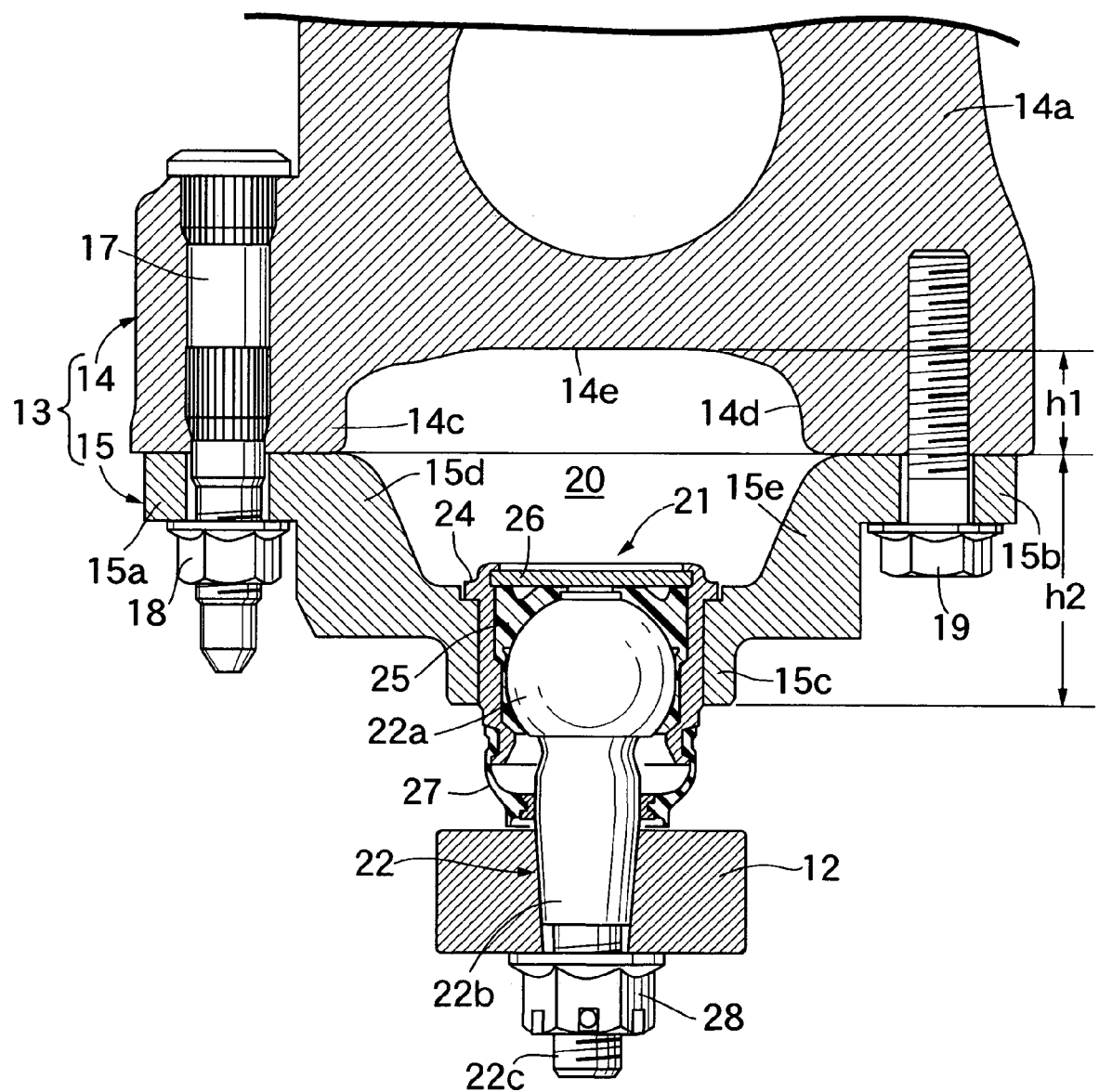
FIG. 4 is a view corresponding to FIG. 3 according to a second embodiment of the present invention.
Figure 5:
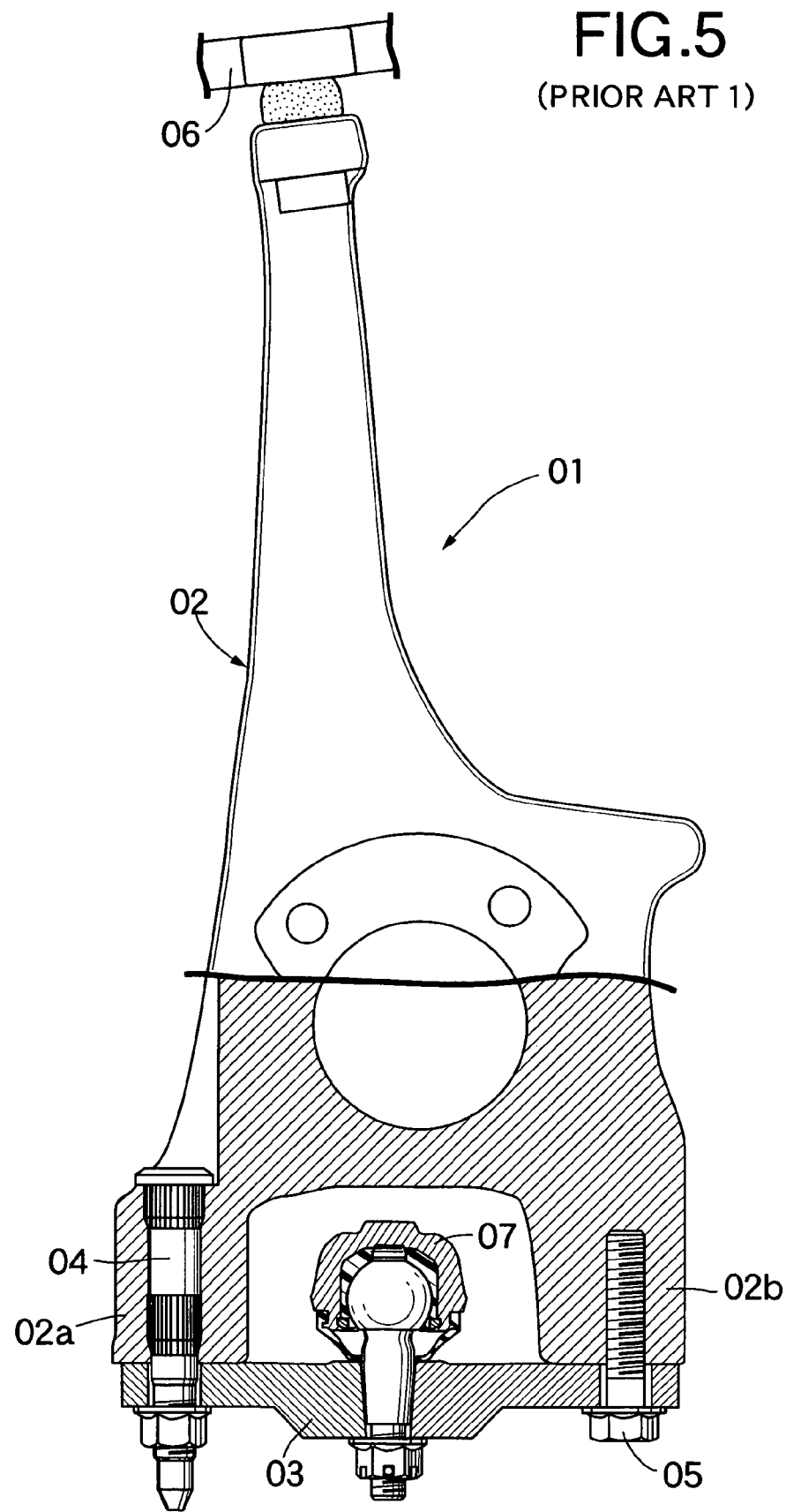
FIG. 5 is a view corresponding to FIG. 2 according to a first conventional example.
Figure 6:
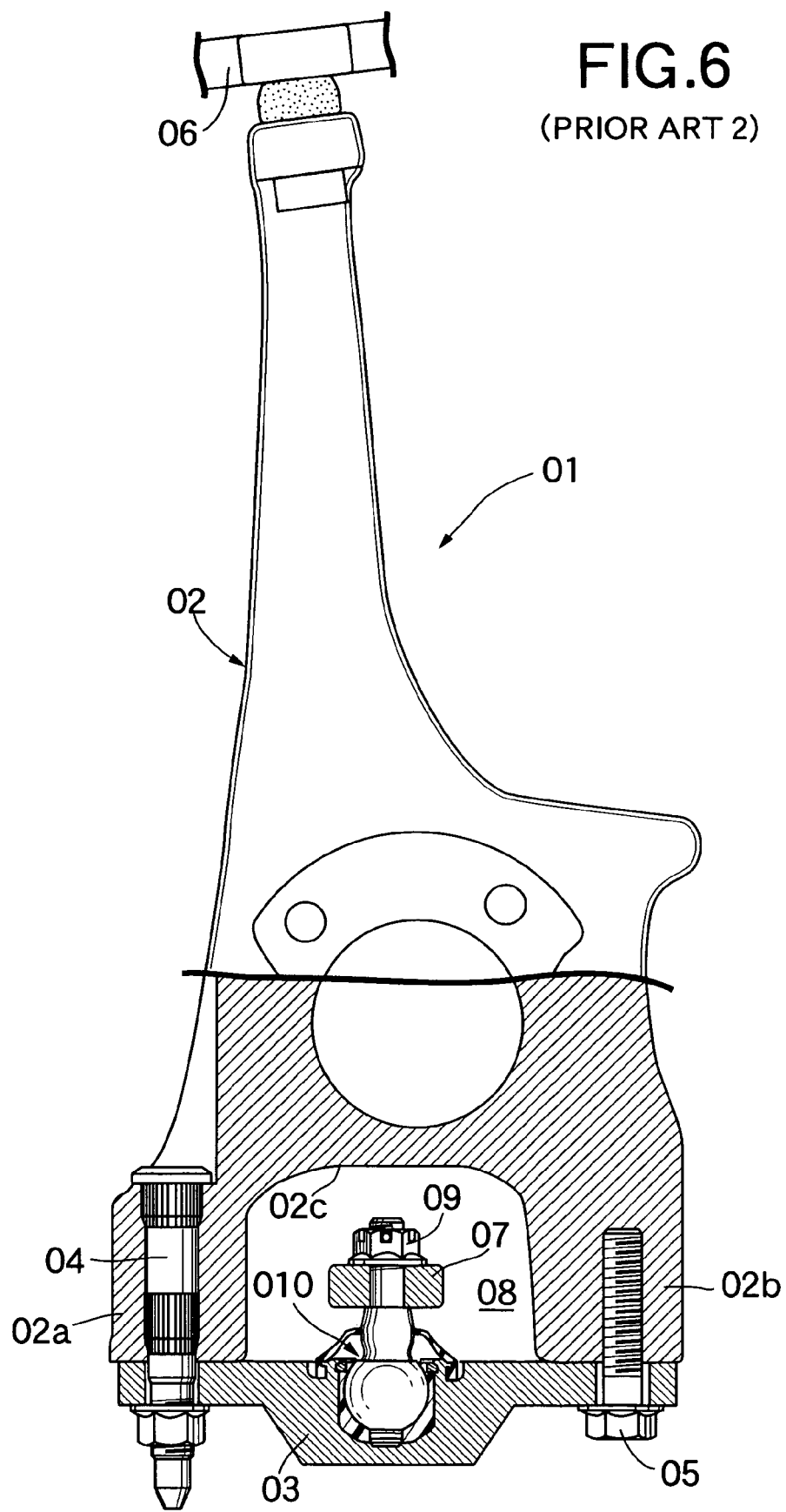
FIG. 6 is a view corresponding to FIG. 2 according to a second conventional example.

Next a second embodiment of the invention will be described with reference to FIG. 4.

In the first embodiment, the ball stud 22 of the ball joint 21 is secured to the lower arm support bracket 15, while in the second embodiment, a housing 24 of a ball joint 21 is secured to a lower arm support bracket 15. Specifically, the housing 24 of the ball joint 21 is pressed from above to down into a mounting hole 15f formed in a lower arm support portion 15c of the lower arm support bracket 15. An outer end of a lower arm 12 in a vehicle width direction fits to a ball stud 22 protruding downward from the housing 24 and is fastened with a nut 28.

Also in the second embodiment, a height h1 from a bottom surface of a recess 14e of a knuckle body 14 to lower ends of bosses 14c and 14d is smaller than a height h2 from the lower ends of the bosses 14c and 14d to the lower arm support portion 15c of the lower arm support bracket 15, that is, an input point of a load from the lower arm 12 to the lower arm support bracket 15. This facilitates machining for the bosses 14c and 14d to protrude in forging the knuckle body 14 to reduce machining costs, and also increases rigidity of the bosses 14c and 14d.

The embodiments of the invention have been described, but the invention is not limited to the above described embodiments, and various changes in design may be made without departing from the subject matter of the invention described in the claims.

For example, the double wishbone type suspension device S is described as an example in the embodiments, but the invention is applicable to any other types of suspension devices.

The knuckle body may be cast from light alloy rather than forged from light alloy.

What is claimed is:

1. A suspension device comprising:
   a knuckle formed by connecting a knuckle body forged or cast from light alloy and a lower arm support bracket made of ferrous metal;
   an upper arm having an inner end in a vehicle width direction connected to a vehicle body, and an outer end in the vehicle width direction connected to an upper portion of the knuckle body; and
   a lower arm having an inner end in the vehicle width direction connected to the vehicle body, and an outer end in the vehicle width direction connected to the lower arm support bracket,
   the lower arm support bracket being secured to lower surfaces of a pair of bosses protruding downward from front and rear ends in a lower portion of the knuckle body,
   wherein a vertical height of the pair of bosses is smaller than a vertical height of the lower arm support bracket.

2. A suspension device comprising:
   a knuckle formed by connecting a lower arm support bracket to a lower surface of a knuckle body so as to form a space;
   an upper arm having an inner end in a vehicle width direction connected to a vehicle body, and an outer end in the vehicle width direction connected to an upper portion of the knuckle body; and
   a lower arm having an inner end in the vehicle width direction connected to the vehicle body, and an outer end in the vehicle width direction connected to the lower arm support bracket via a ball joint,
   the ball joint having a head connected to the lower arm in the space, a shaft extending downward from the head to pass through a mounting hole of the lower arm support bracket, and an external thread extending downward from the shaft and onto which a nut is screwed,
   wherein a distance between the lower surface of the knuckle body facing the space and an upper surface of the outer end of the lower arm in the vehicle width direction is smaller than a distance between a lower end of the external thread of the ball joint and an upper end of the mounting hole of the lower arm support bracket.

* * * * *